United States Patent [19]

Ingram et al.

[11] Patent Number: 4,575,830
[45] Date of Patent: Mar. 11, 1986

[54] INDIRECT SHEARWAVE DETERMINATION

[75] Inventors: John D. Ingram, Houston, Tex.; Josephine L. Murray, Ridgefield, Conn.

[73] Assignee: Schlumberger Technology Corporation, Houston, Tex.

[21] Appl. No.: 434,658

[22] Filed: Oct. 15, 1982

[51] Int. Cl.[4] .............................................. G01V 1/40
[52] U.S. Cl. ..................................... 367/26; 364/422; 367/27; 367/31; 367/75
[58] Field of Search ....................... 367/25, 28, 31, 32, 367/75; 364/422

[56] References Cited

U.S. PATENT DOCUMENTS

| 4,210,965 | 7/1980 | Ingram | 367/26 |
| 4,210,966 | 7/1980 | Ingram | 367/27 |

OTHER PUBLICATIONS

Hamilton, "Elastic Properties of Marine Sediments", J. of Geophysical Research, Jan. 10, 1971, vol. 76, No. 2, pp. 579–603.
Clay et al., "Use of a Two-Dimensional Array to Receive an Unknown Signal in a Dispersive Waveguide", J. of the Acoustical Society of Amer., vol. 47, No. 2, (1970) pp. 435–440.
Cheng et al., "Velocity and Attenuation from Full Waveform Acoustic Logs", SPWLA 22nd Annual Logging Symposium, Jun. 23–26, 1981, pp. 1–19.
Biot, "Propagation of Elastic Waves in a Cylindrical Bore Containing a Fluid", vol. 23, No. 9, Sep. 1952, pp. 997–1005.
Koerperich, "Shear Wave Velocities Determined from Long and Short Spaced Borehole Acoustic Devices", SPE 54th Annual Fall Tech. Conf. and Exhib., Las Vegas, Nevada, Sep. 23–26, 1979.
Piersol, "Time Delay Estimation Using Phase Data", IEEE Transactions on Acoustics, Speech and Signal Processing, vol. ASSP-29, No. 3 (Jun. 1981).
Aron et al., "Formation Compressional and Shear Interval-Transit-Time Logging by Means of Long Spacings and Digital Techniques, Tech. Paper, 53rd Annual Fall Tech Conf and Exhib of SPE, Oct. 1–3, 1978.

*Primary Examiner*—Salvatore Cangialosi
*Assistant Examiner*—K. R. Kaiser

[57] ABSTRACT

A method and apparatus for estimating shear wave velocities where such velocities are difficult or impossible to measure because the shear energy transmission is attenuated or its velocity is equal to or less than direct mud velocity or because the shear wave may not propagate at all under certain conditions. The method and apparatus relate to an indirect technique for determining shear modulus by measuring the phase velocity of the Stoneley wave excitation and using it to estimate the shear modulus and the shear velocity. Using at least two receivers, a window is placed over the Stoneley arrival of the wave detected at each receiver and the Fourier transform of each wave is taken. The difference in phase of the Stoneley wave arrivals is determined. The relative shear modulus involving the Lame constants is estimated by a procedure which includes matching two points on Stoneley wave dispersion curves. From the relative shear modulus, the ratio of formation density to the density of mud, and the compressional velocity of the borehole mud is estimated the shear velocity.

15 Claims, 9 Drawing Figures

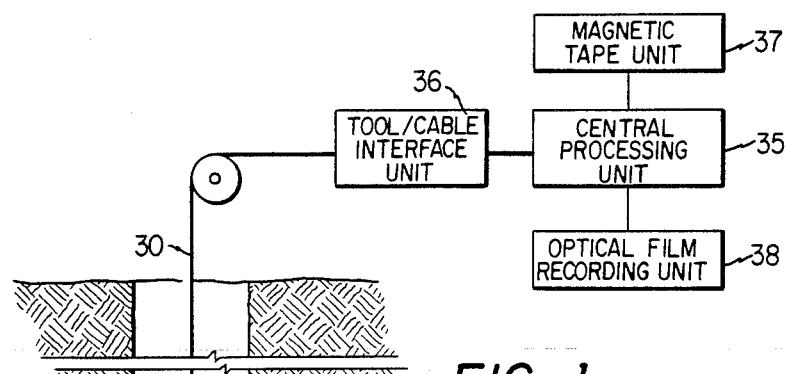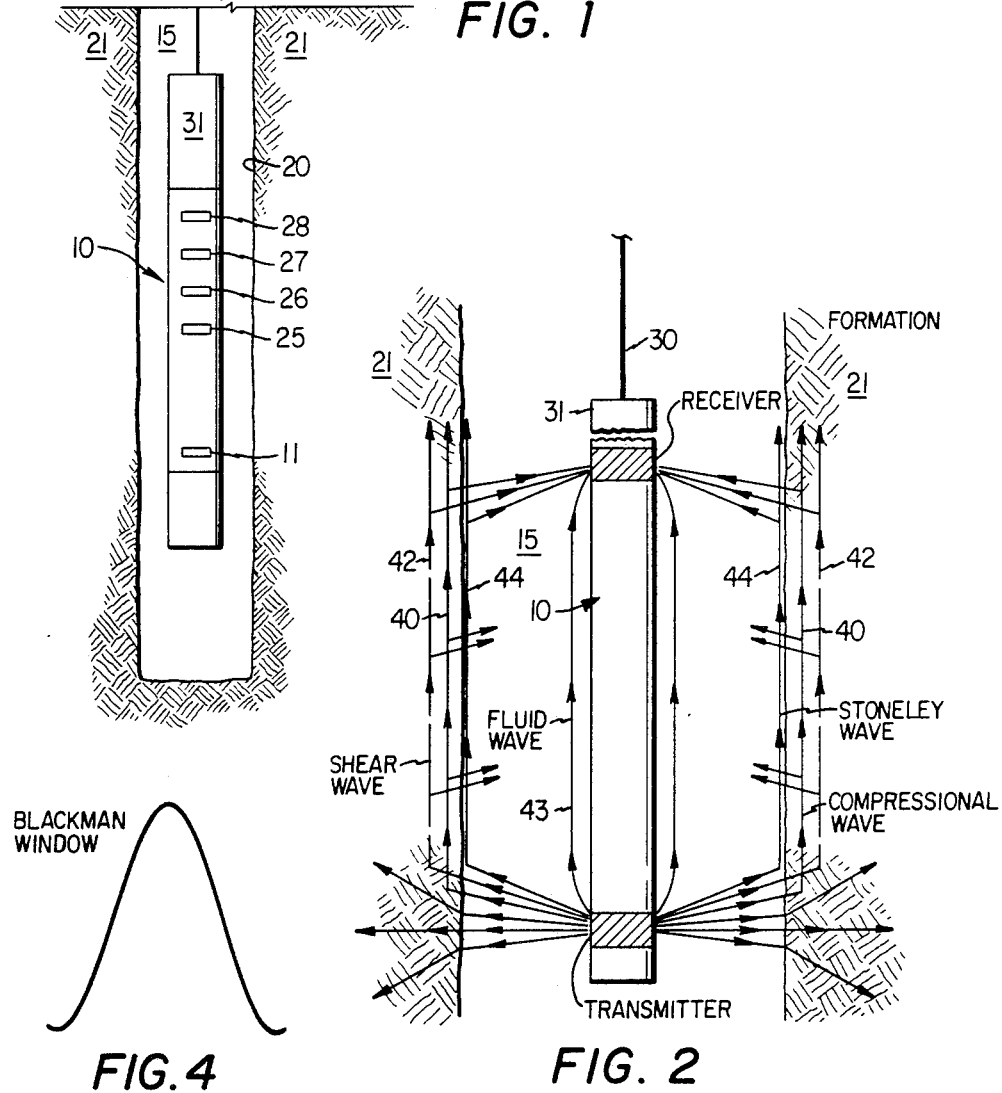

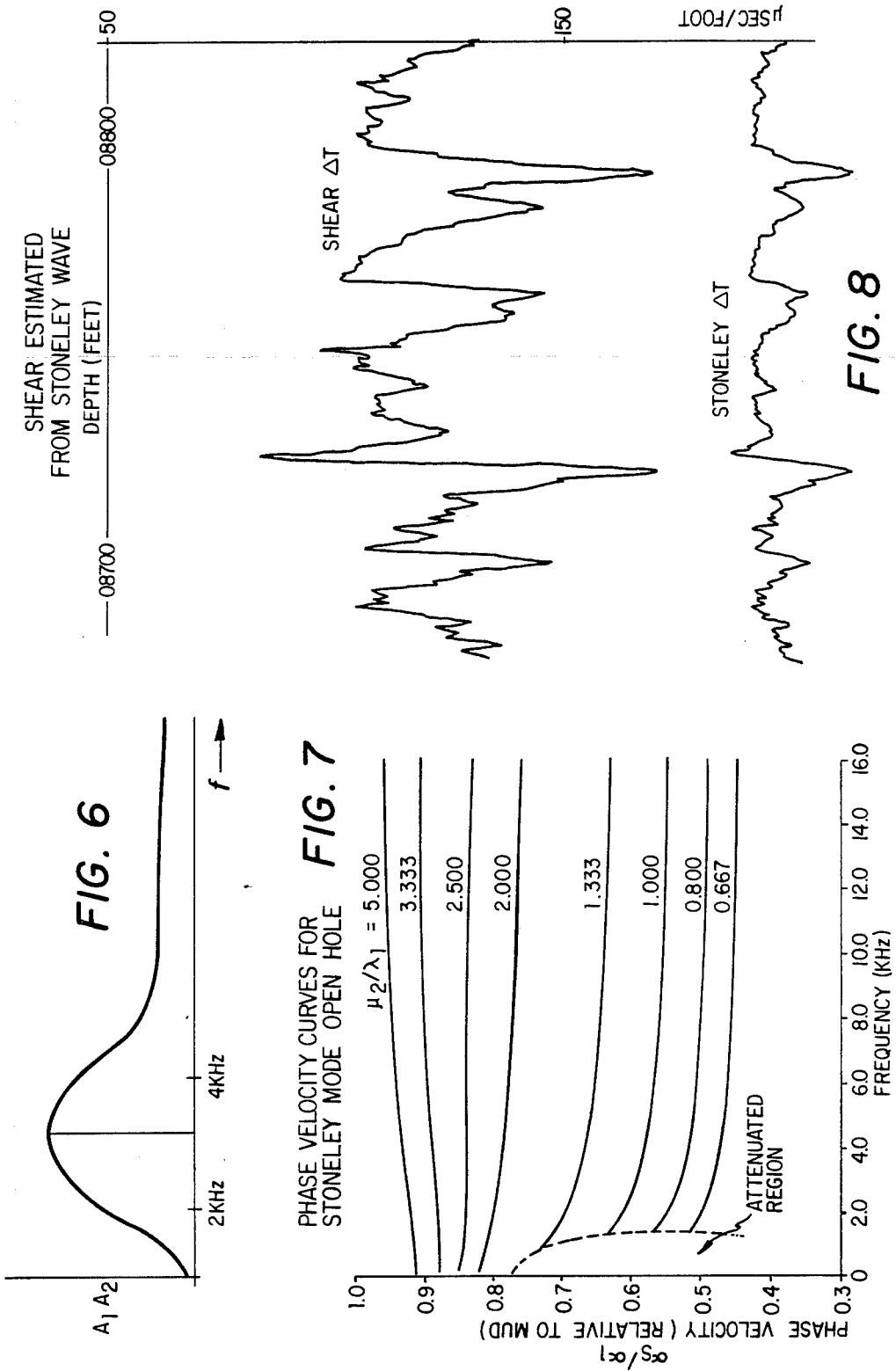

DETERMINATION OF $\beta_2$

INDIRECT SHEARWAVE DETERMINATION

1. FIELD OF INVENTION

This invention relates to methods and apparatus for well logging. More specifically, this invention relates to methods and apparatus for determining parameters of shear waves by investigating acoustic waves propagating as guided waves within a borehole either open hole or cased.

2. Background of Invention

Acoustic well logging techniques and tools are extensively described in the art. Acoustic well logging is used to provide surveys of formations traversed by earth boreholes. In particular, measurements are made of the velocities of acoustic waves to reveal valuable information concerning the type of rocks and the porosity of the rocks in the formations surrounding the borehole. A commonly measured acoustic parameter is the velocity of compressional waves. However, it is desirable that other acoustic wave parameters such as the velocity of shear waves be determined.

Identifying the compressional wave and measuring its velocity is generally not difficult. It is the fastest propagating wave in the formation, is non-dispersive, and is the first to reach an array of borehole receivers when a short burst of energy from a nearby transmitter propagates through the formation.

Measuring shear velocity is considerably more difficult. Because it propagates more slowly, the shear wave arrives later in time. Therefore, its arrival is typically obscured by compressional energy, and velocity determination directly from arrival time is at best difficult and at times impossible.

The areas where shear wave velocity data theoretically or empirically can be applied are diverse. Some of the application areas are seismic amplitude calibration and interpretation, sand control, formation fracturing, reservoir material balance and subsidence studies, lithology, porosity and geopressure prediction.

While rich in possible application areas, shear velocity is difficult to measure automatically with conventional acoustic devices and detection procedures. Except in limited lithology-logging conditions, manual examination of wave forms commonly is required to extract shear velocity. Even then there has been considerable uncertainty in shear arrivals on short-spaced tools due to compressional wave interference. In softer rocks, conventional tools simply do not transmit distinct shear arrivals.

Current axially arranged transmitter-receiver tools are designed primarily for detection of compressional waves. Downhole amplifiers adjusted to accentuate the first compressional wave arrival normally saturate through the shear and the late compressional regions of the wave form. When downhole gain is reduced to eliminate amplifier saturation, one observes that initial shear arrivals generally are superimposed on the later portions of the compressional arrivals. This interference makes automatic detection difficult and leads to a concern about the consistency and dependability of this arrival for determining shear velocity. The interference effect is compounded in that the initial shear energy commonly is not extremely high relative to compressional wave energy. Rather, shear amplitudes are generally low initially and increase with succeeding arrivals. The shear wave onset, therefore, almost always is obscured by compressional wave interference. In some lithologies such as low porosity carbonates, an early shear arrival, probably the second or third shear half cycle, sometimes has relatively high amplitude compared with superimposed compressional arrivals. This high amplitude event is commonly used to determine the shear velocity, however, with recognizable error generally referred to as cycle skipping.

Attempts to record shear wave interval travel time (slowness) automatically in the field generally are not successful, particularly, when one merely tries to track first arrivals because with the time gate set to include shear arriving at the near receiver an earlier high amplitude compressional wave within the time gate at the far receiver causes erroneous triggering at the far receiver. In addition, with the bias level set to exclude compressional waves at the near receiver, attenuation of the first shear arrival at the far receiver pulls its amplitude below the bias level which causes cycle skipping or triggering on a later shear arrival.

Techniques have been developed for determining shear wave slowness where the shear wave is at least partially obscured by the presence of the compressional wave. One such technique is described in copending application filed by co-employees Thomas W. Parks and Charles F. Morris entitled "Method and Apparatus for Determining Acoustic Wave Parameters from Acoustic Well Logging Waveforms" as described in pending application Ser. No. 372,271 filed Apr. 27, 1982 and assigned to the same assignee as the present application.

In the Parks et al application, a method is described for estimating or determining the velocities of various wave components of signals received from a linear array of sonic well logging receivers. One of the wave components is the shear wave component. The method of determining or estimating parameters of these composite acoustic waves arriving sequentially at a plurality of points spaced vertically along the length of a borehole generally comprises steps of generating acoustic energy in the borehole and receiving that energy at each of the points after refraction, reflection and direct transmission through and along the formation adjacent to the borehole. A window is established having predetermined length and moveout. This window is positioned along the composite wave and the energy received is multiplied at each point by the window which is delayed by an amount proportional to the transmitter-spacing thereby attenuating interferring waves. A Fourier transform is generated of that portion of the received energy multiplied by the window to produce a plurality of complex signals in the frequency domain which is simultaneously analyzed to obtain an estimate of the paramaters. A different moveout is then established for the window and for each different moveout position the Fourier transform is produced and analyzed. The window is then incremented along the composite waves and the above steps of multiplying, transformation and analysis are performed to obtain best estimate of the parameters.

The foregoing technique operates well where the complex wave indeed includes the shear wave. There are, however, formation conditions that severely attenuate the propagation of the shearwave or instances where the shearwave will not propagate. A need therefore has remained for an accurate, versatile and reliable method and apparatus for estimating shear wave velocities under all logging conditions including those where the shearwave is highly attenuated or not propagated at all.

SUMMARY OF THE INVENTION

The above needs are met with methods and apparatus of the present invention. In particular, methods and apparatus are provided for an indirect determination of the shear modulus by measuring the phase velocity of a guided wave of acoustic energy, for example, the Stoneley wave and utilizing it to estimate the shear modulus and the shear velocity. Utilizing at least two receiver signals, a "window" is placed over the Stoneley arrival of the wave detected at each receiver and the Fourier transform of each wave is produced. From the Fourier transforms the phase velocity of the Stoneley excitation is determined and the relative shear modulus estimated. From the relative shear modulus, the density of the mud and the compressional velocity of acoustic energy through the borehole mud may be determined the shear velocity of the formation.

More particularly, the method of estimating the parameters of shear waves which may or may not be present in acoustic waves arriving sequentially at a plurality of points spaced vertically along the length of the borehole comprises the steps of generating acoustic energy in the borehole and receiving that energy at each of the points after refraction reflection and direct transmission through and along a formation adjacent the borehole. A window of predetermined length and moveout is established and positioned along the composite wave relative to the estimated arrival of a guided wave. The energy is multiplied by the window and a Fourier transform of the multiplied energy is taken to produce a plurality of complex signals in the frequency domain. The cross-spectral magnitude and phase is determined for each of the adjacent pairs of receiver signals and the phase velocity is computed from the phase at each frequency. The cross-spectral magnitudes are scanned for a peak in the selected frequency range to identify the frequency at which the peak occurs. From the phase velocity versus frequency relationship a value of guided wave phase velocity is selected at the identified frequency and an estimate is made of the ratio of the Lame constants. The Lame constants, the formation density and the mud density together with the velocity of acoustic energy in the mud are utilized to estimate the value of shear wave velocity.

BRIEF DESCRIPTION OF THE DRAWINGS

FIG. 1 is a figurative illustration of a borehole logging system according to the present invention;

FIG. 2 is a refracted wave diagram depicting propagation of acoustic waves in the borehole and the adjacent earth formations;

FIG. 4 illustrates the characteristics of a Blackman window;

FIG. 6 illustrates cross spectral amplitude distribution vs. frequency resulting from the product of complex numbers for adjacent pairs of traces;

FIG. 7 illustrates phase velocity curves for the Stoneley mode in open hole for different values of the ratio of Lame constants $\mu_2$ and $\lambda_1$;

FIG. 8 illustrates a plot as a function of depth of the calculated Stoneley travel time and a trace of shear wave travel time estimated from the Stoneley wave.

DESCRIPTION OF THE PREFERRED EMBODIMENT

Figure 5:
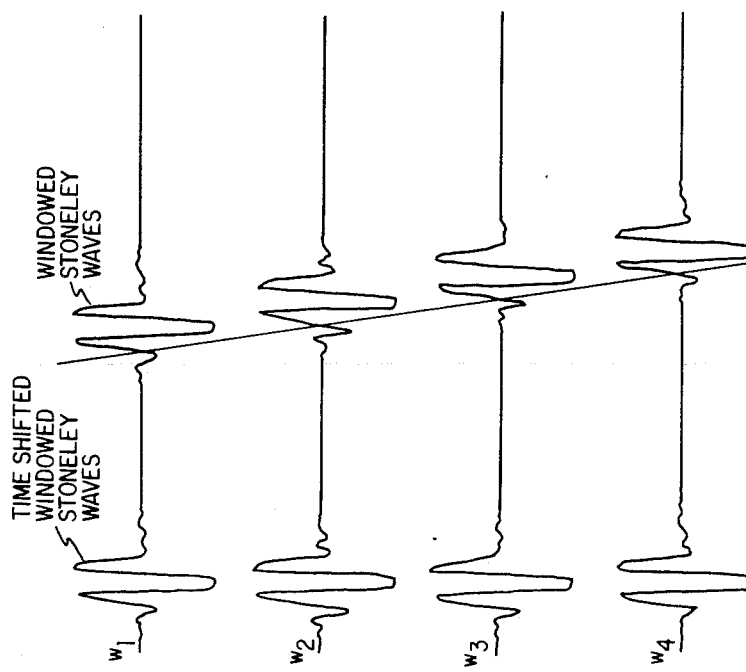
FIG. 5 illustrates the waveforms of FIG. 3 after windowing by the Blackman window and also after being time shifted.

The method and apparatus described herein may be applied to a wide class of acoustic logging tools. A diagram of a typical tool or sonde 10 is shown in FIG. 1. It includes an acoustic transducer, a transmitter 11, used to generate acoustic energy in the form of sonic pulses in the borehole fluid 15 within the borehole 20 and the surrounding formation 21. Four additional acoustic transducers 25, 26, 27 and 28 are provided and utilized as sonic pulse receivers for reception of acoustic energy propagating through the formation and through the borehole. The transmitter 11 is spaced 9 to 13 feet from the near receiver 25 and each of the receivers are spaced 1 (one) foot apart. Bow-spring centralizers (not shown) help keep the tool 10 centered in the borehole 20.

Several times each second, on command from the surface control and processing equipment (not shown), a particular transmitter and receiver combination is selected and the transmitter is excited or fired. Commands are sent down the wireline cable 30 supporting the tool 10 in the borehole 20 and are decoded in an electronic cartridge 31 interconnecting the cable 30 and the tool or sonde 10. The received waveform for each firing is amplified in the cartridge 31 and transmitted up the cable 30 to surface equipment. The mode of transmission may be either analog or digital. If it is digital, the amplified waveform values are sampled at a regular prescribed rate, typically one hundred thousand to two hundred thousand times a second, then digitized in the cartridge. They are then telemetered up the cable 30 as sequences of binary numbers. If it is analog, the amplified waveforms are passed directly up the cable 30 and digitized in the surface equipment. The surface equipment typically includes a central processing unit 35, a tool/cable interface unit 36, a magnetic tape recording unit 37, an optical film recording unit 38 and other equipment. The program executing in the central processing unit 35 is responsible for issuing commands to the tool through the tool/cable interface unit 36, for selecting the transmitter 11 and the receivers 25 or 26 or 27 or 28 and for firing the tool. It also retrieves the waveform data either from a telemetry module in the tool/cable interface unit 36 if digitization is done downhole, or from a digitizer module in the interface unit if analog transmission is used. In either case, these waveform data are recorded using the magnetic tape unit. The program may actually process the waveform data at the well site following the logging operation using the shear wave estimation technique described herein and record the resulting shear velocities using the optical film recording unit. Otherwise processing is performed by a central processing unit located in the remote center using the tapes of waveform data.

When the transmitter 11 is excited it emits an oscillatory burst of acoustic energy in roughly a 5 kHz to 9 kHz frequency band. This burst begins to propagate more or less spherically outward from the transmitter as a compressional (pressure) wave in the borehole fluid 15. As the wave passes into the formation 21, its direction of propagation changes as the refracted array diagrams of FIG. 2 indicate, and its speed increases to that of sound in the specific rock composition. At the same time, some of the energy is converted into shear waves propagating in the formation 21 but at a velocity lower than compressional. In addition some of the transmitted energy never enters the formation but propagates directly in the fluid as a fluid wave or mud wave and other propagation are in the form of higher guided modes such as Stoneley waves or tube waves.

There are therefore several ways for acoustic energy to propagate from transmitter 11 to the receivers 25-28 as shown in FIG. 2: through fluid, then formation, then fluid, all as compressional waves 40; through fluid as compressional, then formation as shear waves 42, then fluid as compressional; completely through fluid as waves 43 and finally as guided waves such as the higher mode waves represented by the Stoneley wave 44. The formation compressional wave travels the fastest and thus is first to arrive at the receiver. The Stoneley or higher order mode guided wave 43 arrives later and the shear wave 42 arrives somewhere between the compressional wave and the Stoneley wave.

Figure 3:
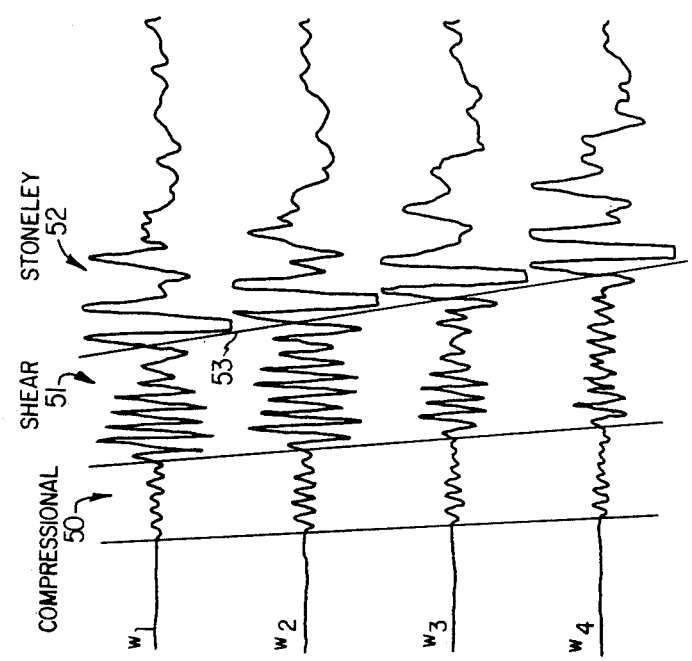
FIG. 3 illustrates typical received wave forms arriving at each of the four depicted receivers.

FIG. 3 illustrates typical wave forms $w_1$, $w_2$, $w_3$, $w_4$ received respectively at the receivers 25-28. The three components, compressional wave 50, shearwave 51 and Stoneley wave 52 are in this example clearly evident, although the Stoneley wave is clipped due to saturation of the A/D converters.

In accordance with the present invention a window is initially applied to the data at the approximate position of the Stoneley wave arrival in order to filter out all data except that data of interest, namely the Stoneley wave. A Blackman window has been utilized because of the onset and termination tapers which avoid the introduction of spurious high frequencies during the windowing operation. However, any similar window function can be utilized. The characteristics of the Blackman window are illustrated in FIG. 4. In the particular use made of that window it had a length of 1,200 microseconds or 1.2 milliseconds.

It is obvious from the waveform shown in FIG. 3 that the Stoneley wave has a moveout from waveform $w_1$ through waveform $w_4$. Where the Stoneley wave is distinct as shown in FIG. 3 visual picking of the Stoneley wave as well as a very close approximation of moveout can be obtained as represented by the line 53. Where the Stoneley wave may be less distinct a procedure of cross correlation may be employed. The cross correlation may be established for different assumed moveout with the correct moveout represented by the maximum cross correlation function. Having determined the position and the approximate desired length of Stoneley wave to be utilized, either by way of visual examination or by way of cross correlation, the position and length of the window may be established. In the example shown, the onset of the Stoneley wave in the waveform $w_1$ occurred approximately 2100 microseconds and the moveout between traces was 200 microseconds. Accordingly the Stoneley arrival in trace or waveform $w_2$ occurred at 2300 microseconds, the arrival of the Stoneley wave in trace or waveform $w_3$ occurred at 2500 microseconds and the Stoneley wave in trace or waveform $w_4$ occurred at 2700 microseconds.

The resultant windowing by the Blackman window is illustrated in FIG. 5 and identified as the windowed Stoneley waves. The next step in the procedure is to determine phase differences between successive waveforms. Due to the low velocity of the Stoneley wave, problems can arise in the computation of phase differences between adjacent pairs of receiver waveforms wherein such differences may be larger than $2\pi$. In order to resolve these phase ambiguities, the waveforms are shifted forward in time by an amount corresponding with the onset of the waveforms in each of the traces. Thus for example, the windowed Stoneley wave in trace $w_1$ is shifted forward 2100 microseconds and the waveforms in traces $w_2$, $w_2$, and $w_4$ are respectively shifted forward 2300 microseconds, 2500 microseconds and 2700 microseconds. This process introduces a known and therefore recoverable phase difference between adjacent receiver pairs and insures that the procedure will only attempt to resolve phase differences which are within the normal range of the arctangent function.

After the individual waveforms $w_i$ (t) are windowed and positioned the Fourier transform of each is taken as set forth in expression (1).

$$w_i(f) = F\{w_i(t)\}, \; i=1,2,3,4 \qquad (1)$$

The phase differences between the adjacent receiver pairs are determined in accordance with expression (2)

$$\phi_j = \text{phase} \{w_j W_{j+1}^*\} \; j=1,2,3 \qquad (2)$$

where * denotes complex conjugation.

If $\Delta_i$ is the shift introduced into the waveform $w_i$, then the true phase differences $\phi_j'$ can be restored as the following:

$$\phi_j' = \phi_j + 2\pi f(\Delta_{j+1} - \Delta_j), \; j=1,2,3 \qquad (3)$$

The individual phase differences $\phi_j'$ are averaged to produce a phase difference $\phi$ at each frequency value, from which the phase velocity is calculated as $$\alpha = \frac{2\pi f}{\Phi} \qquad (4)$$

where $\alpha$ is the phase velocity and f is the frequency.

The phase velocities are computed over the frequency range of interest, namely 2 to 4 KHz and the value of $\alpha$ associated with the peak of the magnitude spectrum is chosen as the Stoneley wave velocity $\alpha_s$. The selection of the peak of the magnitude spectrum is represented in FIG. 6 which shows the amplitude spectrum of the product of transforms shown in equation (2) plotted as a function of frequency. Within the frequency range of interest namely 2 to 4 KHz there is a peak, the position of which when projected to the abscissa identifies the frequency at which the value of $\alpha$ is the Stoneley wave velocity $\alpha_s$.

Estimation of the shear velocity $\beta_2$ requires the computation of the ratio of the Lame constants $\mu_2/\lambda_1$. In the low frequency limit, without accounting for dispersion this ratio is given by $$\frac{\mu_2}{\lambda_1} = \frac{1}{(\alpha_1/\alpha_s)^2 - 1} \qquad (5)$$

where $\alpha_1$ is the mud velocity.

The effects of dispersion may be accounted for by assuming an approximation of the form $$\frac{\mu_2}{\lambda_1} = \frac{A}{[(\alpha_1/\alpha_s)^2 - 1]^\lambda} \quad (6)$$

The values for A and $\gamma$ are chosen by matching the equation with two points on the Stoneley wave dispersion curves illustrated in FIG. 7. The dispersion curves of FIG. 7 were prepared in accordance with the technique disclosed by M. A. Biot in an article entitled "Propagation of Elastic Waves in a Cylindrical Bore Containing a Fluid". This article appeared in the Journal of Applied Physics Volume 23, Number 9, September 1952, pages 997–1005. The dispersion curves may be calculated for any given conditions that may be encountered including of borehole diameter. Specifically the dispersion curves of FIG. 7 were computed for an open hole borehole diameter of 8 inches, a mud velocity of 5500 feet per second, a mud density of 1 GM per cc, a Poisson's ratio of 0.30 and a formation density of 2.5 GM per cc. As any of the foregoing parameters change, the suite of dispersion curves will, of course, assume different characteristics.

In carrying out the invention the aforementioned selected frequency is identified on the abscissa and projected vertically to intercept the dispersion curves represented by different values of the ratio of the Lame constants. Any two of the dispersion curves in the nonattenuated region may be selected and the intercept of the projection of frequency to those curves is then projected to the ordinant to identify values of $\alpha_s/\alpha_1$. These values are then utilized in the solution for the values of A and $\lambda$, which are utilized in the determination of the value of the ratio of the Lame constants $\mu_2/\lambda_1$. The approximation of shear velocity is obtained by way of the following equation $$\beta_2 \approx \alpha_1 \sqrt{\frac{\mu_2/\lambda_1}{\rho_2/\rho_1}} \quad (7)$$

where $\rho_2$ is the formation density and $\rho_1$ is the mud density.

In carrying the procedure, the value of mud velocity $\alpha_1$ is determined from the measured value of mud density which readily can be obtained by sampling the density of mud at the surface. The value of formation density is approximated and assumed to be a constant. In carrying out the procedure in field evaluation, the ratio $\rho_2/\rho_1$ had a value of 2.5.

The approximate or estimated value of the shear velocity $\beta_2$ is now plotted as a function of depth and the procedure repeated for the next succeeding position of the logging tool with each resulting determination or estimation of shear velocity plotted as a function of depth to produce a shear wave $\Delta t$ log as illustrated in FIG. 8. At the option of the operator a Stoneley $\Delta t$ log determined from the phase velocity in a manner above described may also be plotted as a function of depth.

The procedure of the present invention has utility not only in open holes but also in cased holes. For example, there are conditions that arise where the directly propagating compressional and shear arrivals are obscured by casing arrivals in unbonded sections. The Stoneley wave, due to its low velocity and high amplitude, is usually distinguishable in such wave forms and the present invention may be employed to estimate shear velocity from cased hole data where the shear wave arrivals cannot be detected due to interference from the casing signal.

Figure 9:
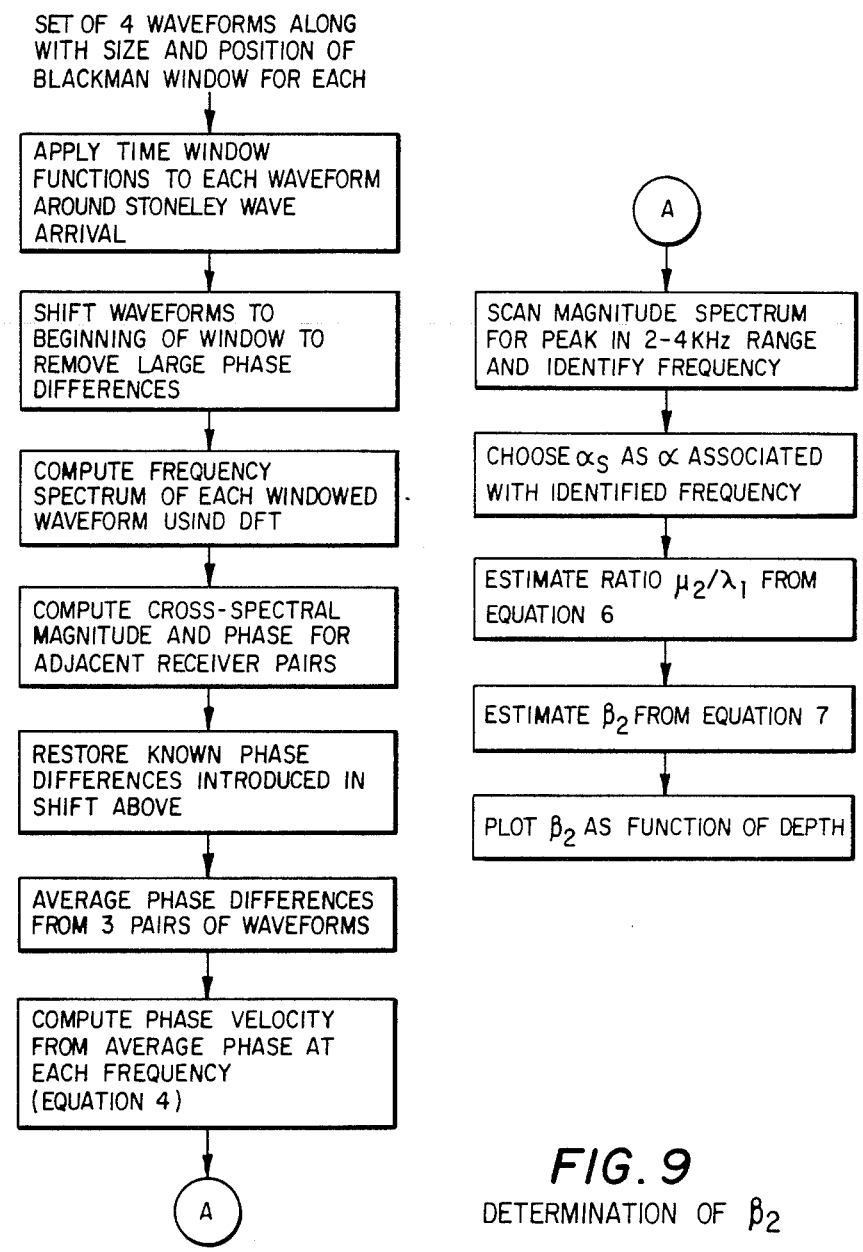
FIG. 9 presents flow diagrams for the performance of the present invention.

An abbreviated flow diagram for the estimation or determination of shear velocity method of the present invention is shown in FIG. 9. The details of each step in the procedure were set forth above. However, in summary, a set of four waveforms or more, as many as eight, along with the size and position of a Blackman window is inputted to a computing system which may be of the general purpose digital type for example a Digital Equipment PDP 11 or VAX computer. The time window function is applied to each waveform around the Stoneley wave arrival, and following windowing the windowed waveforms are time shifted to remove large phase differences. A computation of the frequency spectrum of each time shifted windowed waveform is performed using Discrete Fourier Transform (DFT) and from the frequency spectrum there is computed the cross spectral magnitude and phase for adjacent receiver pairs. The known phase differences or phase shifts are restored and an average of phase differences taken from at least three pairs of waveforms.

The phase velocity $\alpha$ is computed from the average phase at each frequency employing the relationships set forth in Equation 4 and the magnitude spectrum is scanned for a peak in a frequency range of interest, for example, 2 to 4 KHz and the frequency at which the peak occurs is identified. The Stoneley phase velocity $\alpha_s$ is identified as the $\alpha$ associated with the identified frequency and an estimate is made of the ratio of the Lame constants utilizing Equation 6. Thereafter the shear velocity $\beta_2$ is determined from Equation 7 and this value plotted as a function of depth.

Having thus described the method and apparatus in accordance with the invention for estimating shear wave velocity from Stoneley wave velocity, the advantages of the invention can be appreciated particulary in those environments where the shear wave is highly attenuated, nonpropagating or is obscured by noise. Variations of the specific steps described herein may be adopted while remaining within the scope of the invention as set forth by the following claims.

What is claimed is:

1. A method of estimating parameters of shear waves included in acoustic waves arriving sequentially at a plurality of points spaced vertically along the length of a borehole comprising the steps of:
   (a) generating acoustic energy in the borehole,
   (b) receiving the acoustic energy at each of the points after refraction, reflection and direct transmission through and along a formation adjacent the borehole,
   (c) establishing a window of known length with a known moveout between adjacent receiving points,
   (d) positioning said window along the composite wave relative to the estimated arrival of a selected guided acoustic wave,
   (e) multiplying the energy received at each point by the window,
   (f) generating the Fourier transform of that portion of received guided wave energy multiplied by the window, to produce a plurality of complex signals in the frequency domain,
   (g) determining the cross-spectral magnitude and phase for pairs of signals from adjacent receiving points, (h) computing the phase velocity $\alpha$ from the phase at each frequency, (i) scanning the cross-spectral magnitudes for a peak in a selected frequency range and identifying the frequency at which the peak occurs, (j) selecting from the phase velocity $\alpha$ versus frequency a value of guided wave phase velocity $\alpha_s$ at the identified frequency, (k) estimating the ratio of Lame constants $\mu_2$ and $\lambda_1$ in accordance with the expression $$\frac{\mu_2}{\lambda_1} = \frac{A}{[(\alpha_1/\alpha_s)^2 - 1]^\gamma}$$

where A and $\gamma$ are values found by matching two points on known dispersion curves for said guided wave where $\alpha_1$ represents mud velocity, (l) obtaining an estimate of shear wave velocity $\beta_2$ in accordance with the expression $$\beta_2 \approx \alpha_1 \sqrt{\frac{\mu_2/\lambda_1}{\rho_2/\rho_1}}$$

where $\rho_2$ is formation density and $\rho_1$ is mud density, and (m) plotting the estimate of $\beta_2$ as a function of depth.

2. The method of claim 1 wherein the selected guided wave is a Stoneley wave.

3. The method of claim 1 wherein the window is a Blackman window.

4. The method of claim 3 wherein the Blackman window has a duration of 1200 microseconds.

5. The method of claim 1 including the step of time shifting the windowed energy prior to Fourier transformation to compensate for large phase differences.

6. The method of claim 2 including the step of time shifting the windowed energy prior to Fourier transformation to compensate for large phase differences.

7. The method of claim 3 including the step of time shifting the windowed energy prior to Fourier transformation to compensate for large phase differences.

8. The method of claim 5 wherein the amount of time shift introduced to the windowed energy is removed following Fourier transformation.

9. The method of claim 6 wherein the amount of time shift introduced to the windowed energy is removed following Fourier transformation.

10. The method of claim 7 wherein the amount of time shift introduced to the windowed energy is removed following Fourier transformation.

11. The method of claim 1 wherein the mud velocity $\alpha_1$ is assumed in a range of 5555 ft/sec to 5000 ft sec.

12. The method of claim 1 wherein the mud velocity $\alpha_1$ is approximated from a measured value of mud density.

13. The method of claim 1 wherein the ratio $\rho_2/\rho_1$ is assumed a constant.

14. The method of claim 13 wherein the assumed value of the ratio is 2.5.

15. A system for estimating parameters of shear waves included in acoustic waves arriving sequentially at a plurality of points spaced vertically along the length of a borehole comprising the steps of:

(a) means for generating acoustic energy in the borehole, (b) means for receiving the acoustic energy at each of the points after refraction, reflection and direct transmission through and along a formation adjacent the borehole, (c) means for establishing a window of known length with a known moveout between adjacent points and for positioning said window along the composite wave relative to the estimated arrival of Stoneley waves, (d) means for multiplying the energy received at each point by the window, (e) means for generating the Fourier transform of that portion of received Stoneley wave energy multiplied by the window, to produce a plurality of complex signals in the frequency domain, (f) means to determine the cross-spectral magnitude and phase for pairs of signals from adjacent points, (g) means to compute the phase velocity $\alpha$ from the phase at each frequency, (h) means to scan the cross-spectral magnitudes for a peak in a selected frequency range and identify the frequency at which the peak occurs, (i) means to select from the phase velocity $\alpha$ versus frequency a value of Stoneley phase velocity $\alpha_s$ at the identified frequency, (j) means for estimating the ratio of Lame constant $\mu_2$ and $\lambda_1$ in accordance with the expression $$\frac{\mu_2}{\lambda_1} = \frac{A}{[(\alpha_1/\alpha_s)^2 - 1]^\gamma}$$

where $\alpha_1$ represents mud velocity, and A and $\gamma$ are value found by matching two points on known Stoneley wave dispersion curves, (k) means for obtaining an estimate of shear wave velocity $\beta_2$ in accordance with the expression $$\beta_2 \approx \alpha_1 \sqrt{\frac{\mu_2/\lambda_1}{\rho_2/\rho_1}}$$

where $\rho_2$ is formation density and $\rho_1$ is mud density, and (l) means for plotting the estimate of $\rho_2$ as a function of depth.

* * * * *